No. 745,785. PATENTED DEC. 1, 1903.
E. H. COATES.
WARMING DEVICE FOR USE BY INVALIDS.
APPLICATION FILED MAR. 7, 1903.
NO MODEL.
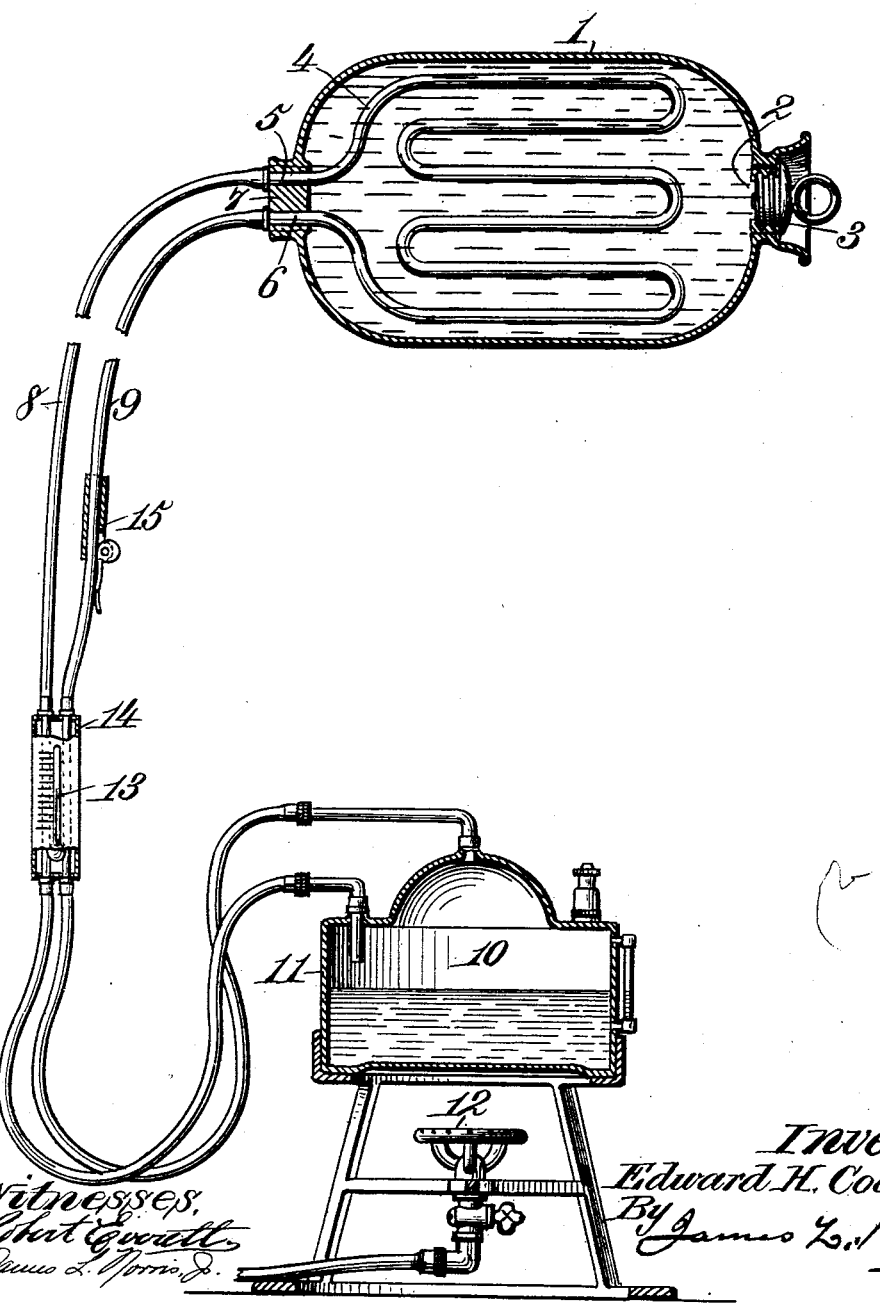
Inventor
Edward H. Coates, No. 745,785. Patented December 1, 1903.

UNITED STATES PATENT OFFICE.

EDWARD H. COATES, OF MACON, GEORGIA.

WARMING DEVICE FOR USE BY INVALIDS.

SPECIFICATION forming part of Letters Patent No. 745,785, dated December 1, 1903.

Application filed March 7, 1903. Serial No. 146,697. (No model.)

*To all whom it may concern:*

Be it known that I, EDWARD H. COATES, a citizen of the United States, residing at Macon, in the county of Bibb and State of Georgia, have invented new and useful Improvements in Warming Devices for Use by Invalids, of which the following is a specification.

This invention relates to a warming device adapted for use by invalids; and it has for its object the provision of a device of this character which can be constantly maintained at a uniform temperature.

The invention comprises a receptacle containing liquid, a coil-pipe within said receptacle, a heating device, and a flexible tubular connection between said coiled pipe and said heating device.

In the accompanying drawing, wherein I have illustrated a convenient embodiment of my invention, the figure is a sectional view of my improved warming device.

The reference-numeral 1 indicates a hot-water bag or other receptacle suitable for heating purposes. The receptacle 1 is provided with the interiorly-screw-threaded inlet 2, normally closed by the screw-plug 3, by means of which inlet it may be filled with hot water or other liquid. A pipe 4, the ends 5 6 of which pass through a suitable bushing 7 in the lower end of the receptacle 1, is coiled around the interior of the receptacle, as shown.

Attached to the ends 5 6 of the pipe 4 are the flexible pipes or tubes 8 9, which communicate at their lower ends with the chamber 10 of a heating device 11.

The chamber 10 may contain water or other suitable liquid and may be heated in any desired manner, such as by a gas-jet or vapor-burner 12.

Constructed as above described, the operation of my improved warming device is as follows: The receptacle 1 is filled with hot water and is placed in the bed or against the portion of the body which is to be warmed. The burner 12 is then lighted and the water in the chamber 10 heated. Steam or vapor generated by the water in the chamber 10 then circulates through the pipes 8, 4, and 9. The steam circulating through the coiled pipe 4 effectually maintains the water in the receptacle 1 at a uniform temperature.

It will be understood, of course, that any form of hot-water bag or receptacle may be employed with my invention and that any desired kind of heating device may be adopted. I therefore do not desire to be limited in these respects except as defined in the following claims.

In the ordinary forms of water-bags now in use the water contained therein falls in temperature after several hours, and it is necessary to furnish an additional supply of hot water. This falling of the temperature and the time lost in replenishing the supply of hot water necessarily creates an objection to the old forms of water-bags. With my invention it is possible to maintain a uniform temperature for any period of time.

A further advantage of my invention is that it permits the temperature of the water in the receptacle to be readily regulated and controlled. To facilitate this controlling of the temperature, I have provided a thermometer 13, which is held between the flexible tubes of the device by a casing 14. The temperature of the fluid passing through the flexible tubes on its way to the hot-water receptacle is thus registered by the thermometer. By this means any desired temperature may be maintained.

In order to facilitate the control of the temperature, I have provided a clip 15 on one of the flexible tubes, by means of which the passage of fluid through said tube is controlled. When the temperature of the water-receptacle becomes too great and it is desired to effect a decrease of temperature, it is only necessary for the patient or attendant to operate the clip 15 in such manner as to decrease the supply of fluid to the coiled pipe of the water-bag.

It will be observed that the principal features of my invention are the provision of a body of liquid in the receptacle, the provision of a coiled pipe extending through said liquid, and the supplying of the heating medium to said coiled pipe in such manner that the heat of said pipe is radiated to the liquid contained in said receptacle.

Having thus described my invention, what I claim as new, and desire to secure by Letters Patent, is—

1. In a warming device for invalids, the combination of a receptacle adapted to contain water and having a closable filling-orifice, of a coiled pipe extending through said receptacle, a heating device, and flexible tubing connecting said heating device and said coiled pipe.

2. In a warming device for invalids, the combination of a receptacle adapted to contain water and having a closable filling-orifice, of a coiled pipe extending through said receptacle, a heating device, flexible tubing connecting said heating device and said coiled pipe, a clip for controlling the passage through said flexible tubing, and a thermometer connected with said flexible tubing.

3. In a warming device for invalids, the combination of a receptacle adapted to contain water and having a closable filling-orifice, of a coiled pipe extending through said receptacle, a heating device, a pair of flexible tubes connecting said heating device and said coiled pipe, a clip on one of said tubes for controlling the passage therethrough, a casing attached to said tubes, and a thermometer held between said tubes by said casing.

In testimony whereof I have hereunto set my hand in presence of two subscribing witnesses.

EDWARD H. COATES.

Witnesses:
GEO. W. REA,
WILLIAM H. CLARKE.